United States Patent [19]

Gaitten, deceased

[11] Patent Number: 4,522,239
[45] Date of Patent: Jun. 11, 1985

[54] SWATH CUTTING AND GRIPPING TREE DELIMBER

[75] Inventor: Walden M. Gaitten, deceased, late of Sylacauga, Ala., by Dorothy A. Gaitten, executrix

[73] Assignee: Southeastern Technology, Inc., Bessemer, Ala.

[21] Appl. No.: 542,229

[22] Filed: Oct. 14, 1983

[51] Int. Cl.³ .................................................. B27L 1/00
[52] U.S. Cl. ................................... 144/2 Z; 30/379.5; 144/343
[58] Field of Search ..................... 144/2 Z, 3 D, 34 R, 144/335, 338, 343; 30/379, 379.5; 83/928

[56] References Cited

U.S. PATENT DOCUMENTS

| | | | |
|---|---|---|---|
| 1,364,432 | 1/1921 | Georgelis | 30/379.5 |
| 2,538,371 | 1/1951 | Le Tourneau | 144/34 R |
| 3,032,956 | 5/1962 | Mullet . | |
| 3,234,976 | 2/1966 | Grant | 144/2 Z |
| 3,343,575 | 9/1967 | Trout | 144/2 Z |
| 3,389,728 | 6/1968 | Galis . | |
| 3,664,391 | 5/1972 | Coffey . | |
| 3,688,816 | 9/1972 | Runeson . | |
| 4,013,106 | 3/1977 | Albright . | |
| 4,063,359 | 12/1977 | Luscombe | 30/379.5 |
| 4,269,241 | 5/1981 | Hickman . | |
| 4,411,070 | 10/1983 | Boyum et al. | 30/379.5 |
| 4,467,849 | 8/1984 | Denis | 144/34 R |

FOREIGN PATENT DOCUMENTS

| | | |
|---|---|---|
| 980663 | 12/1975 | Canada . |
| 983824 | 2/1976 | Canada . |
| 1009123 | 4/1977 | Canada . |
| 1130174 | 8/1982 | Canada . |
| 1161342 | 1/1984 | Canada . |

Primary Examiner—W. D. Bray
Attorney, Agent, or Firm—Cushman, Darby & Cushman

[57] ABSTRACT

Apparatus for removing limbs of standing trees to maintain a power line right-of-way free of tree limb interference comprising a self-propelled vehicle having power operated ground stabilizing support leg assemblies, a telescoping boom mounted on said vehicle for horizontal swinging movement about an upright axis and for vertical pivoting movement and a limb cutting assembly on the opposite free end of the boom. The limb cutting assembly includes a mounting structure mounted on the boom for movements about a longitudinal axis with respect to the boom, a power operated cutter having a convex cutting periphery mounted on the mounting structure for movement between a retracted inoperable position and an extended operative position wherein convex cutting periphery extends longitudinally outwardly from the mounting structure and is exposed both longitudinally outwardly and transversely outwardly so as to enable the same to be moved with a transverse swath cutting action by virtue of the movements of the boom, and limb gripping arms carried by the mounting structure for movement from an inoperative position disposed longitudinally inwardly of the cutter so as to permit the swath cutting action thereof and an operative position disposed longitudinally outwardly of the cutter when the latter is in its retracted position so as to grippingly engage a limb or a group of limbs and hold the same in a position to be cut in response to the movement of the cutter from its retracted position into its extended position.

31 Claims, 8 Drawing Figures

SWATH CUTTING AND GRIPPING TREE DELIMBER

This invention relates to tree delimbers and more particularly to apparatus for trimming limbs of trees standing along a high voltage power line right-of-way so as to maintain the power lines free from tree limb interference.

Current commercial practices in maintaining high voltage right-of-ways include the use of power chain saws manually handled by operators elevated to an access position within gondolas carried on the free end of a telescoping boom horizontally swingingly and vertically pivotally mounted on a self-propelled vehicle.

There have been various proposals in the patented literature over the years for enabling the limb trimming operation to be performed mechanically under the control of an operator seated in the vehicle so as to eliminate the physical hazard and effort involved in current practices.

An early proposal contained in the patented literature is disclosed in U.S. Pat. No. 3,032,956. The proposal disclosed in this patent is simply to mount on the end of the outer section of a telescoping boom a power driven circular saw. The outer boom section is mounted for rotational adjustment with respect to the inner boom section about a longitudinal axis. In addition, the proposed mounting at the end of the outer boom section provides for rotational adjustment of the power driven circular saw about an axis extending perpendicular to the longitudinal axis of the telescopic boom.

U.S. Pat. No. 3,389,728 discloses an arrangement in which a power operated chain saw is mounted on the end of the telescoping boom for pivotal movement about an axis transverse to the longitudinal axis of the boom. Moreover, in order to provide the capability of controlling the movement of the limbs after the severing operation is performed, power operated limb grippers are mounted on a second telescoping boom which is mounted on the vehicle alongside the first for independent horizontal swinging movement and vertical pivoting movement.

A more recent U.S. Pat. No. 4,269,241 proposes to combine the cutting and gripping functions into a single assembly requiring only a single telescoping boom for mounting the same (see also U.S. Pat. No. 3,664,391). The cutter embodied in the combined assembly of U.S. Pat. No. 4,269,241 is a power driven circular saw like the cutter of U.S. Pat. No. 3,032,956. The assembly includes a guide structure providing forwardly and outwardly diverging guide bars mounted on the outer end of the telescoping boom for rotational movement about the longitudinal axis of the boom so as to initially orient the bars on opposite sides of a limb to be severed. Thereafter, by extending the telescoping boom the guide bars serve to guide the limb into the central throat of the guide structure. The limb is then clamped in the throat of the guide structure by power operated pivoted clamps and severed by moving the cutter through the clamped limb. (See also U.S. Pat. Nos. 3,688,816 and 4,013,106).

Despite these proposals, the actual commercial practices continue to be carried by the man in the gondola wielding a conventional portable power operated chain saw.

An object of the present invention is to provide an apparatus embodying a combination of components which cooperate together in such a way as to provide a commercially acceptable solution to the problem discussed above. In accordance with the principles of the present invention, this objective is accomplished by utilizing as some of the components of the combination, many of the components which have been utilized in the different combinations of the patent proposals. More specifically, the combination of the present invention, like those noted above, includes a vehicle, preferably of the articulated all-purpose off-road type, and a telescoping boom mounted on the vehicle for horizontal swinging movement and vertical pivoting movement. Preferably, the boom mounting is located rearwardly of the rear wheels of the articulated rear section of the vehicle which is provided with four out-rigger power operated legs or supports for use during a trimming operation after the vehicle has been self-propelled into a desired position of operation. In addition the combination includes a limb cutting assembly carried by the free end of the telescoping boom which cooperates with the boom by virtue of the movements imparted thereto and additional movements embodied in the cutting assembly so as to enable limb trimming to proceed in a highly efficient and effective manner which heretofore could not be achieved.

The attainment of this more efficient and effective cutting is based upon the following operational premises. First, the apparatus must be sufficiently large to effect trimming on both sides of the right-of-way for a substantial extent at one position of operation so as to minimize the unproductive time required in moving the vehicle and moving the four outrigger legs into ground supporting relation. Second, the cutting assembly must have the capability of selectively individually gripping and cutting the relatively few limbs which overlie the power lines to an extent such that to permit them to fall freely after severance might present a hazard with respect to the lines. Third, and perhaps most importantly the cutting assembly must have the capability of swath cutting the remaining overwhelming majority of the limbs without the necessity of repeating relatively complex individual cutting movements for each individual limb.

In accordance with the principles of the present invention the third cutting capability noted above is accomplished by mounting a power driven cutter on a mounting structure such that it can be moved from a retracted position into an extended position in which a substantial convex cutting periphery extends longitudinally outwardly of the mounting structure and is exposed both longitudinally outwardly and laterally outwardly. With such a cutting exposure with the cutter in such an extended position swath cutting is made possible by simply moving the boom through one or more of its three possible movements.

The second cutting capability is provided by mounting a pair of gripping arms on the mounting structure for movement from a normally inoperable position extending longitudinally inwardly away from the exposed cutting periphery of the cutter when the latter is extended for swath type operation into a longitudinally outwardly extending operative position engageable on opposite sides of a limb with the cutter in its retracted condition so that it can thereafter be moved in a limb severing movement into its extended position. In order to be able to grip and cut the limbs extending from the tree trunks in directions parallel to the power wires as well as transversely toward the same the mounting structure is mounted on the free end of the boom for rotational movements about a longitudinal axis with respect to the boom. This movement may on occasion also be useful during a swath cutting operation.

Another object of the present invention is the provision of an apparatus for removing limbs of the type described which is simple in construction, effective in operation, and economical to manufacture and maintain.

These and other objects of the present invention will become more apparent in the course of the following detailed description and appended claims:

The invention may best be understood in conjunction with the accompanying drawings wherein an illustrative embodiment is shown.

Figure 1:
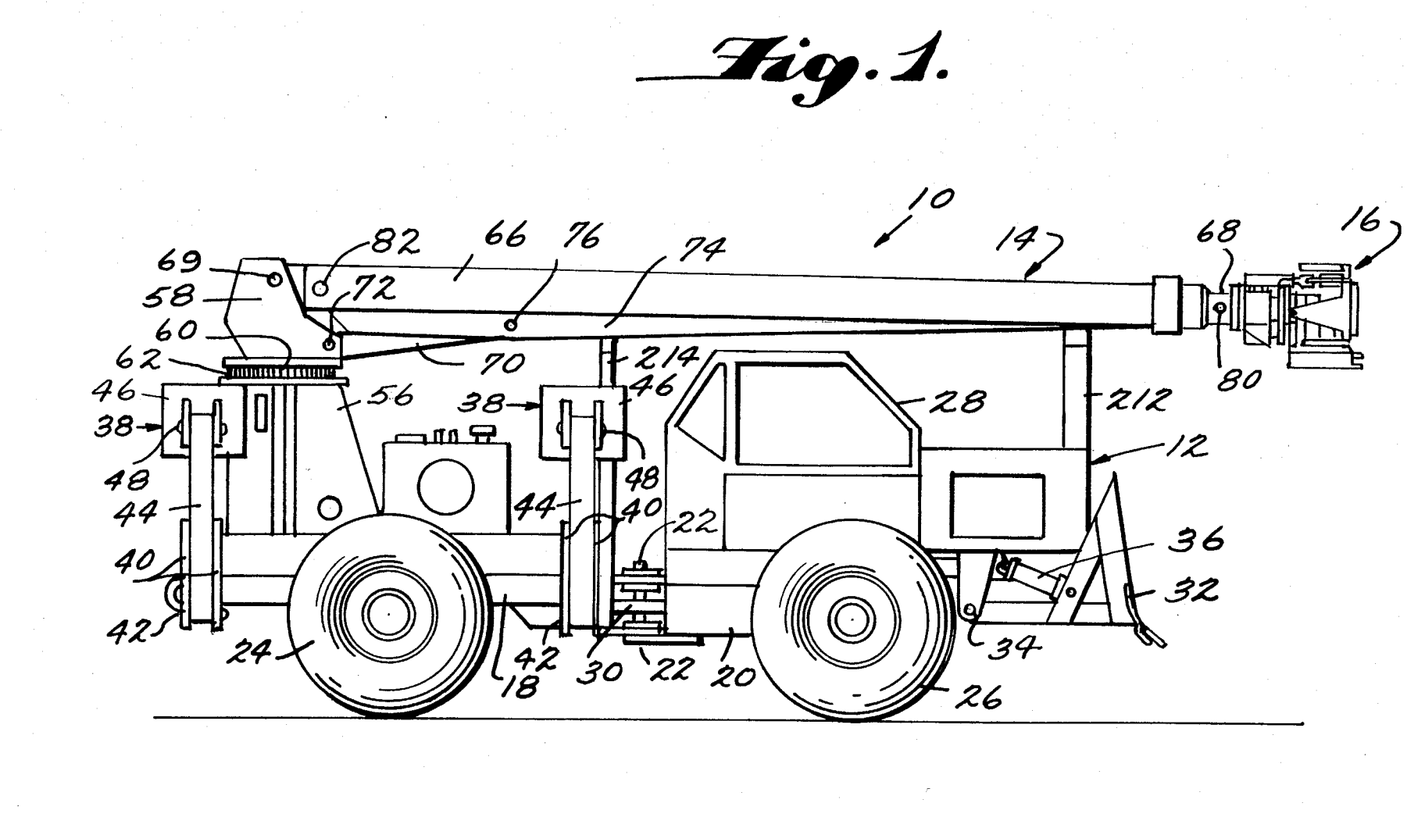
FIG. 1 is a side elevational view of a tree delimbing apparatus embodying the principles of the present invention showing the same in its transport position.
Figure 2:
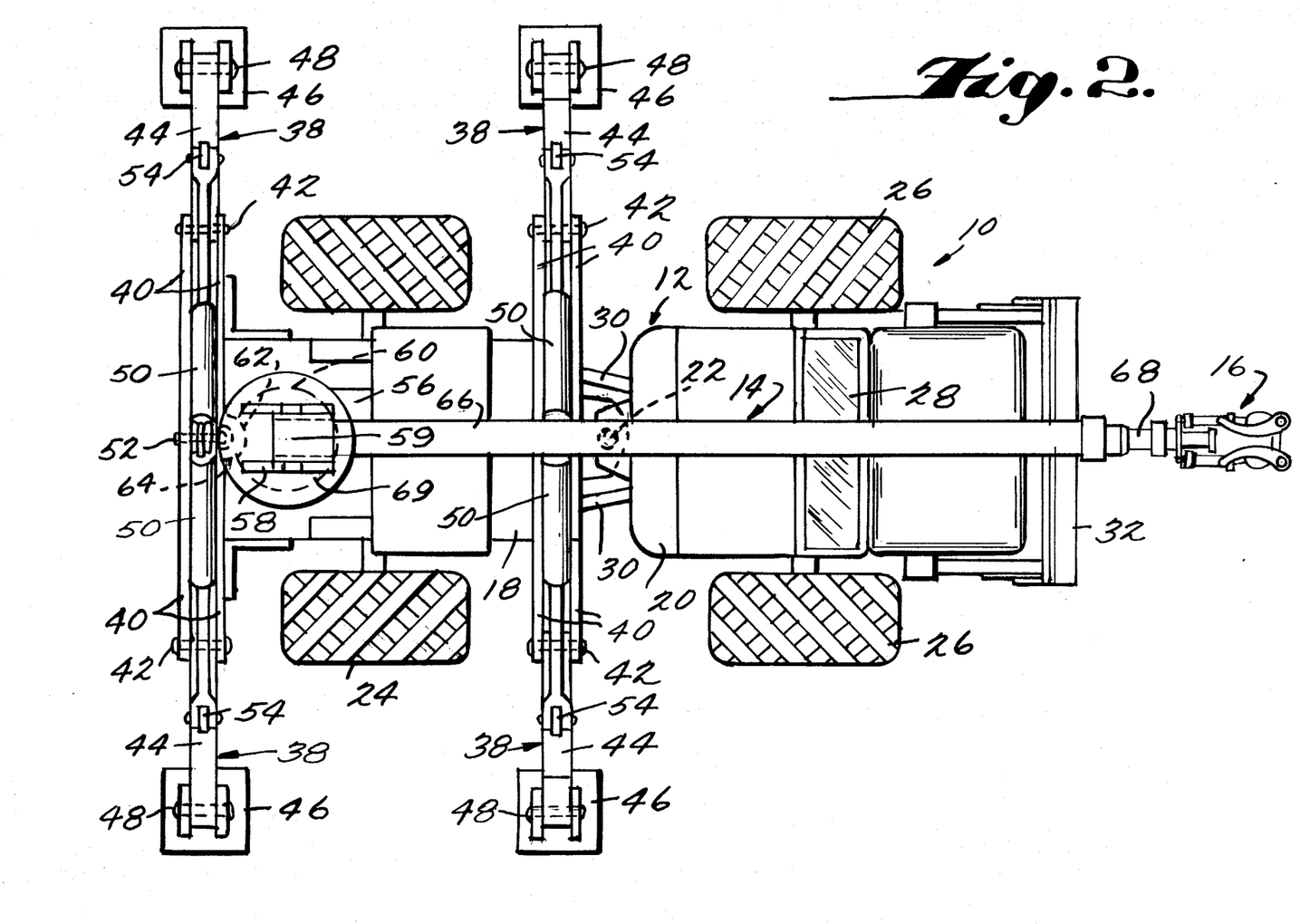
FIG. 2 is a top plan view of the apparatus shown in FIG. 1, illustrating the four outrigger legs deployed in their operative stabilizing position.

Referring now more particularly to the drawings, there is shown in FIGS. 1 and 2 thereof a tree delimbing apparatus, generally indicated at 10, which embodies the principles of the present invention. The apparatus includes three major components, namely a power operated self-propelled all-terrain vehicle, generally indicated at 12, a telescoping boom assembly, generally indicated at 14, mounted on the vehicle 12 for horizontal swinging movement and vertical pivotal movement and a limb cutting assembly, generally indicated at 16 mounted on the free end of the telescoping boom assembly 14.

The vehicle 12 is preferably an all-terrain vehicle of generally conventional construction of the type which includes a rear frame section 18 and a separate front frame section 20, which are pivotally connected together by a pair of spaced pivot pin assemblies 22 for pivotal movement about a vertical axis disposed between the frame sections. The rear frame section 18 is supported upon a pair of power driven rear wheel assemblies 24, and the front frame section 20 is supported by a pair of power driven front wheel assemblies 26. Steering movements of the vehicle are accomplished by an operator seated in a cab structure 28 on the front frame section, 20 actuating controls which move a pair of hydraulic piston and cylinder units 30 suitably connected between the rear frame section 18 and front section 20 on opposite sides of the pivot pin assemblies 22.

Preferably, in order to provide the vehicle 12 with the ability to traverse difficult terrain, a bulldozer blade assembly 32 is mounted forwardly of the forward frame section 20, as by a pivot pin assembly 34, for vertical swinging movement about a horizontal axis between a raised storage position, as shown in FIG. 1, and a lowered operative position. The bulldozer blade assembly 32 is raised and lowered by any suitable means such as a hydraulic piston cylinder unit 36 suitably connected between the front frame section 20 and the bulldozer blade assembly 32.

The telescoping boom assembly 14 is preferably mounted on the rear frame section 18. In order to stabilize this mounting, the rear frame section 18 has four outrigger support leg assemblies 38 carried at the four corners thereof. Each outrigger support leg assembly 38 includes a pair of mounting plates forming a bracket 40 fixed to the associated corner of the rear frame section 18. Pivotally mounted between the lower outer ends of each mounting bracket 40 is one end of a rigid leg member 44. The opposite end of each leg member 44 has a foot plate assembly 46 pivoted thereto, as by a pivot pin 48. In this way, each leg member 44 is mounted for movement between a transversely outwardly extending operative position, as shown in FIG. 2, wherein the foot plate assembly 46 is engaged with the ground and an upwardly extending storage position wherein the associated foot plate assembly 46 is pivoted inwardly as shown in FIG. 1. Each support leg assembly 38 is moved between its operative and storage positions by any suitable means, such as a hydraulic piston and cylinder unit 50, suitably connected between the inner portion of the associated mounting brackets 40, as indicated at 52, and an upstanding lug 54, fixed to the central portion of the associated leg member 44.

The mounting of the telescoping boom assembly 14 on the rear frame section 18 is preferably such that the vertical axis of its horizontal swinging movement is disposed centrally of the frame and rearwardly of the rotational axis of the rear wheel assembly 24. As best shown in FIG. 1, the mounting is accomplished by an upstanding rigid mounting structure 56, fixedly secured to the rear frame section and a turnable boom supporting yoke structure 58. As shown, the yoke structure 58 is mounted on the rigid mounting structure 56 for turning movement about a vertical axis, indicated at 59 in FIG. 2. Any suitable means may be provided for effecting the turning movement of the yoke structure 58. As shown, the yoke structure is provided with a spur gear 60 along its lower portion which meshes with a driving pinion 62. The driving pinion 62 is selectively rotated in either direction by a reversible hydraulic motor 64, mounted within the mounting structure 56.

The telescoping boom assembly 14 includes an outer boom section 66, which telescopically receives therein an inner boom section 68. While the boom assembly shown is made up of only two telescoping boom sections, it will be understood that three or more such sections may be utilized if desired. As shown, the lower end of the outer telescoping boom section 66 is pivotally supported in the turnable yoke structure 58, as by a transverse horizontal pivot pin 69. Any suitable means may be provided for effecting the pivotal movement of the outer boom section 66 about the pivot pin 69 and, as shown, such means preferably takes the form of a hydraulic piston and cylinder unit 70 pivoted to the yoke structure, as indicated at 72, and to depending strengthening ribs 74 on the boom sections 66, as indicated at 76.

The telescopic movement between the outer and inner boom sections 66 and 68 may likewise be accomplished by any suitable means. As shown in FIG. 5, the means again is preferably in the form of a hydraulic piston and cylinder unit 78, one end of which is connected, as shown at 80, to the inner boom section and the opposite end of which is connected to the outer boom section, as at 82. Preferably the boom sections are of non-circular cross-sectional configuration so as to prevent relative turning movements about their longitudinal axis of telescoping movement. As shown, the cross-sectional configuration is substantially square.

Figure 5:
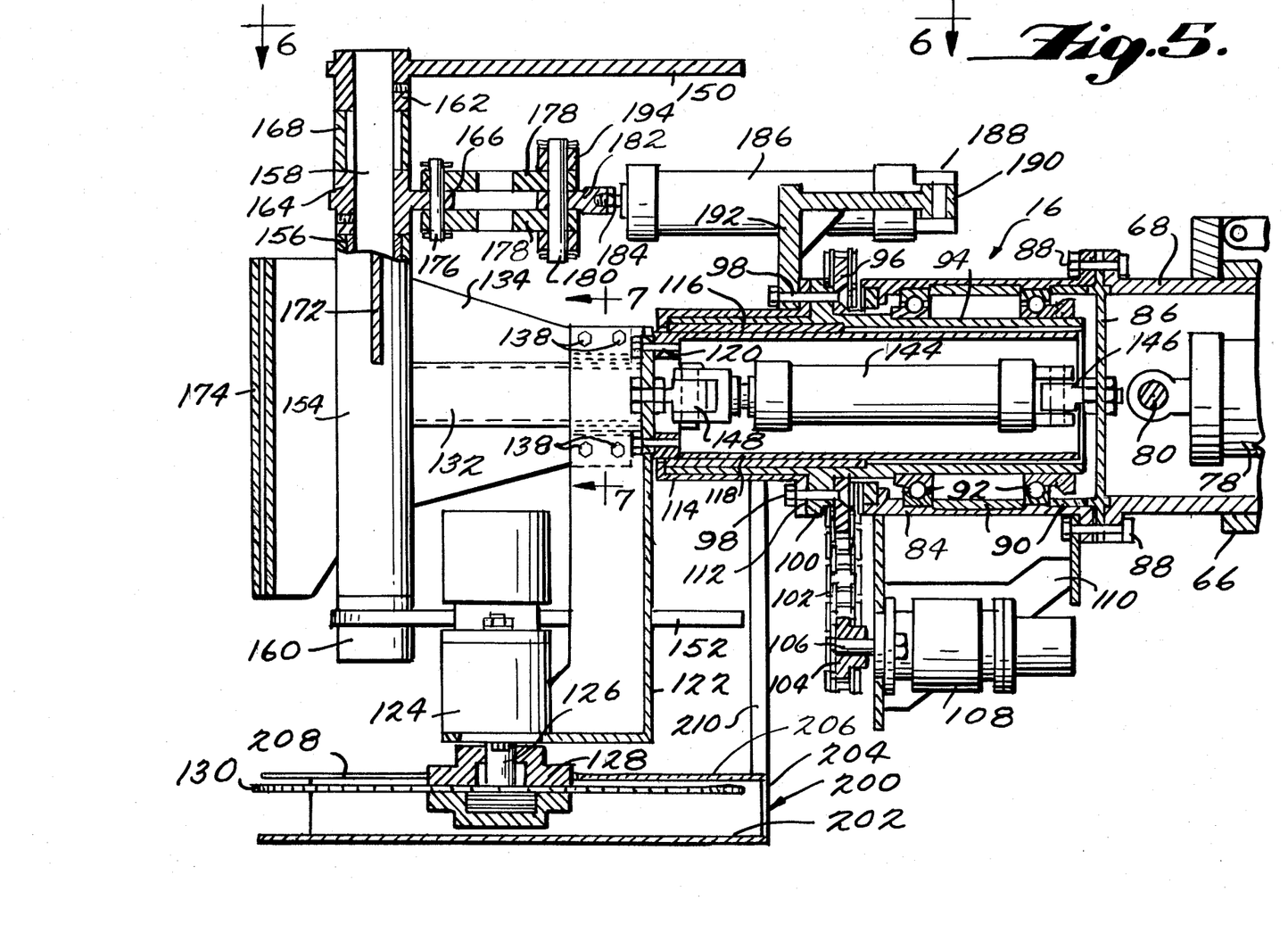
FIG. 5 is a longitudinal vertical sectional view of the limb cutting assembly of the apparatus with parts broken away for purposes of clearer illustration, the cutter and gripper arms being shown in their retracted positions.

Referring now to FIGS. 3 through 7, and more particularly FIG. 5, the limb cutting assembly 16 is connected to the free end of the inner telescoping boom section 68 for turning movement about the longitudinal axis of telescoping movement of the boom by a tubular mounting member 84. One end of the tubular mounting member 84 is exteriorly flanged as is the adjacent end of the inner boom section 68. The flanges are fixedly interconnected with a partition member 86, as by a series of bolts 88 or the like. Suitably positioned within the mounting member 84, as by spacers 90, is a pair of bearing assemblies 92 which serve to rotably mount a rotatable tubular member 94 within the tubular mounting member 84.

The rotatable member 94 constitutes a part of a mounting structure for the limb cutting assembly 16 and extends outwardly of the mounting member 84. Any suitable means may be provided to effect the rotational or turning movement of the rotatable member 94 and mounting structure associated therewith. As shown, such means preferably includes a sprocket ring or wheel 96, fixed, as by a series of bolts 98, to the rear surface of a flange 100 formed on the central periphery of the rotatable member 94. A chain 102 is trained about the sprocket ring 98 and about a drive sprocket 104 fixed to the output shaft 106 of a hydraulic motor 108. Motor 108 is suitably mounted in fixed relation below the mounting member 84, as by a bracket structure 110. Bolts 98 which serve to connect the sprocket ring 96 to the flange 100 also serve to connect a flange 112 of a tubular member 114 to the flange 100 so that the member 114 rotates with the rotatable member 94. Member 114 has its opposite end interiorly flanged so as to support a bearing 116 within the member 114 and the associated portion of the rotatable member 94. Bearing 116 serves to slidably mount a cutter carrying member 118 within the rotatable member 94. The members 94, 114 and bearing 116 may be regarded as an outer tubular member and member 118 an inner tubular member which is mounted therein for longitudinal reciprocating movement. The outer end of the cutter carrying member 118 is interiorly flanged to receive bolts 120 which serve to fixedly connect a cutter mounting bracket 122 to the forward end of the cutter carrying member 118. The mounting bracket 122 is L-shaped in elevation and U-shaped in cross-sectional configuration. The lower leg of the L-shaped mounting bracket 122 fixedly receives a hydraulic motor 124 which has an output shaft 126 extending downwardly therefrom. Fixed to the output shaft 126 as by a coupling assembly 128 is a circular saw blade 130 of conventional configuration constituting the cutter.

Figure 7:
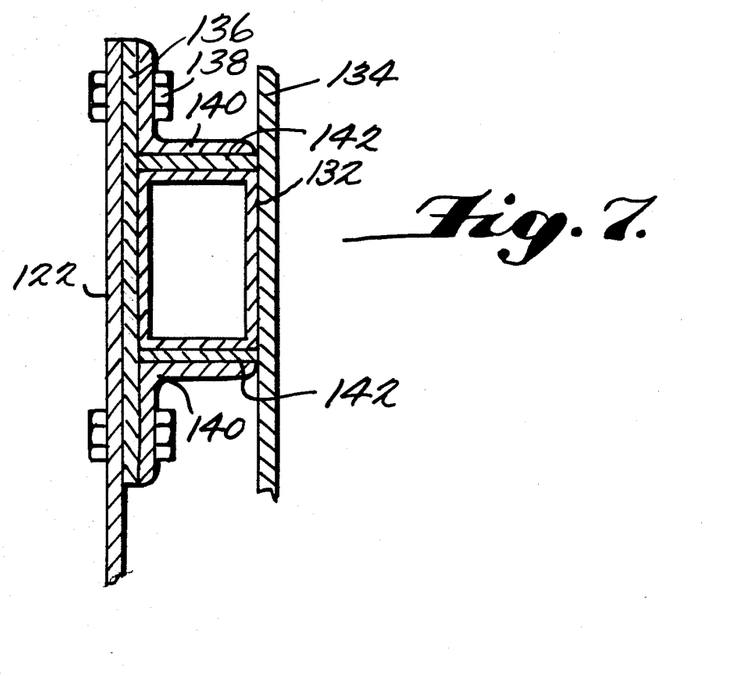
FIG. 7 is an enlarged fragmentary sectional view taken along the line of 7—7 of FIG. 5.

Any suitable means may be provided for restricting the movement of the inner tubular member 118 within the bearing 116 to a rectilinear motion. As shown, such means includes a pair of elongated tubular guide rails 132 suitably fixed at their rear ends, as by welding or the like, to opposite sides of the tubular member 114. The guide rails 142 extend forwardly and are reinforced transversely outwardly by triangular gusset plates 134. As best shown in FIG. 7, each side of the mounting bracket 122 has a vertical wear plate 136 fixed to the outer surface thereof for engaging the adjacent inner surface of the associated guide rail 132. As shown in FIG. 7, each guide rail 132 is preferably of hollow rectangular cross-section configuration. Each vertical wear plate 136 is fixed to the associated side of the mounting bracket 122 by bolts 138 which also serve to mount a pair of angle irons 140 in positions above and below the upper and lower surfaces of the associated guide rail 132. Wear plates 142 are mounted between each angle iron and the associated surface of the associated guide rail 132. It can be seen that with this arrangement the inward and outward movements of the inner tubular member 118 are guidingly restricted to rectilinear movements.

Any suitable means may be provided for effecting the rectilinear movements of the inner member 118 and the cutter 130 carried thereby. As shown, such means is preferably in the form of a hydraulic piston and cylinder unit 144. As best shown in FIG. 5, the cylinder end of the unit 144 is connected, as indicated at 146, to the central portion of the partition member 86, and the piston end thereof is connected, as indicated at 148 to the mounting bracket 122. The arrangement is such as to permit relative rotation between the piston and the cylinder of the unit 144.

From the above it can be seen that the cutter in the form of the circular disk saw blade 130 is rotatable about an axis which is perpendicular to the longitudinal telescoping axis of the telescoping boom assembly 14. By virtue of the rotational mounting of the rotatable member 94, the axis of rotation of the cutter is capable of being displaced angularly about the longitudinal axis of the telescoping movement of the telescoping boom assembly. This movement is effected by energizing the hydraulic motor 108. In addition, the rotational axis of the cutter 130 is capable of being transversely translated by virtue of the sliding movement of the inner tubular member 118 within the outer tubular members 94 and 114. This translational movement is effected by the operation of the hydraulic piston and cylinder unit 144. In terms of the cutting plane of the cutter, actuation of the hydraulic motor 108 serves to orient the cutting plane in different angular positions with respect to the longitudinal axis of the boom, while actuation of the hydraulic unit 144 serves to advance or retract the cutter within its cutting plane. This latter movement is particularly useful in conjunction with the limb gripping function provided by the limb cutting assembly 16.

Figure 6:
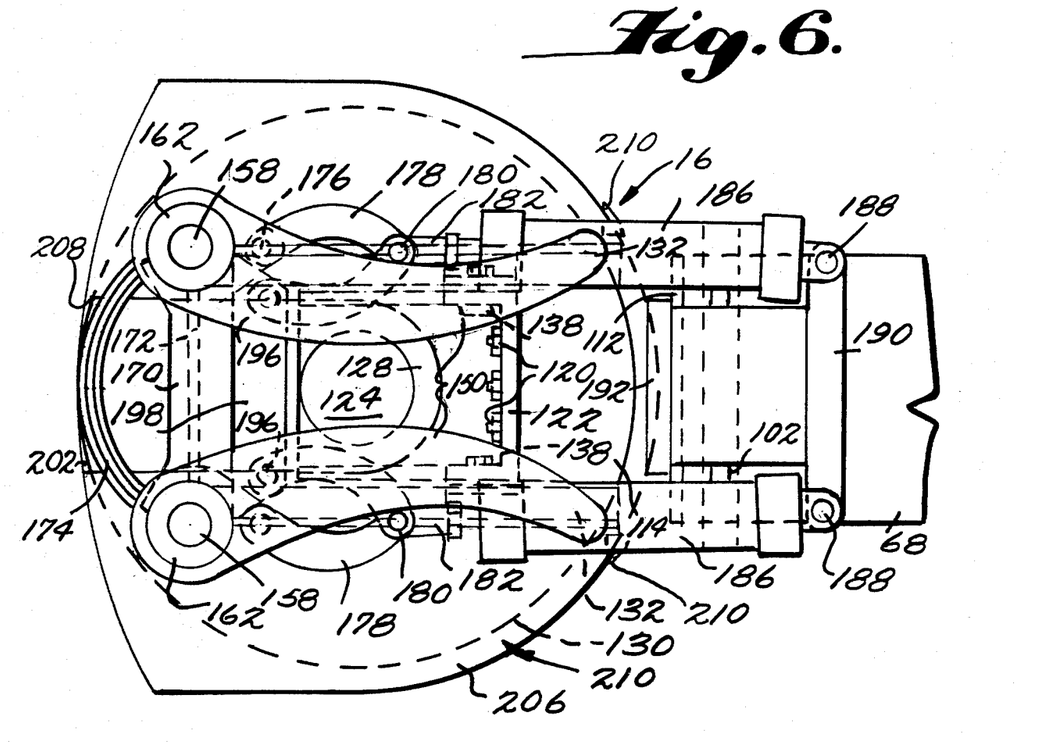
FIG. 6 is a fragmentary top plan view taken along the line of 6—6 of FIG. 5.
Figure 8:
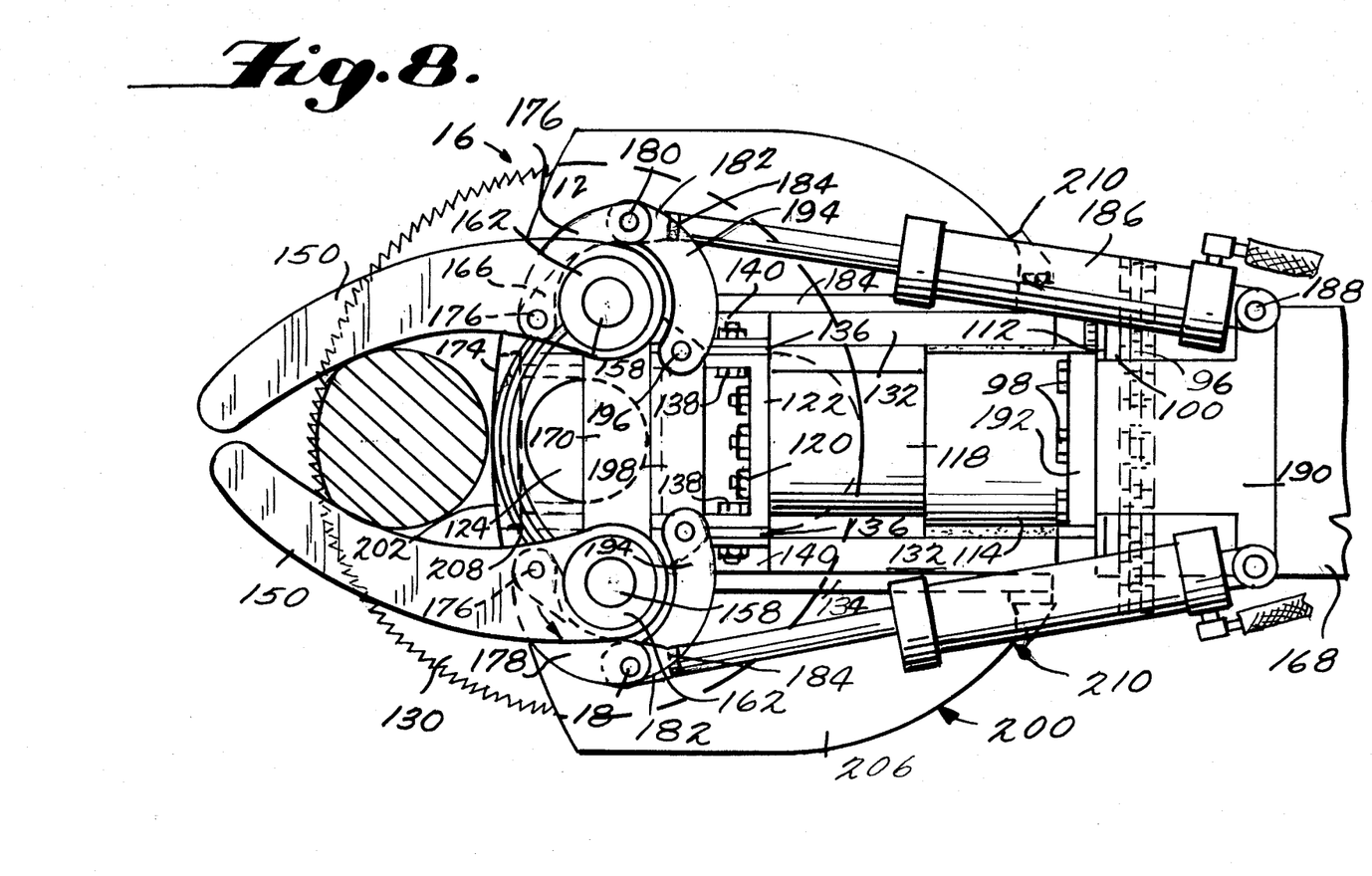
FIG. 8 is a view similar to FIG. 6, showing the cutter and gripper arms in their extended positions.

The limb gripping function is performed by cooperating pairs of upper and lower tree gripper arms 150 and 152. The gripper arms 150 and 152 are mounted for movement between rearwardly extending retracted positions, as shown in FIG. 6, and forwardly extending gripping positions, as shown in FIG. 8. As shown, the mounting structure of the limb cutting assembly also includes a pair of vertically extending tubular shaft supports 154 rigidly secured, as by welding and the like, to the forward ends of the guide rails 132 and gusset plates 134. The upper and lower ends of the tubular members 154 are counterbored to receive sleeve bearings 156 which serve to rotatably support a pair of vertical shafts 158. Shafts 158 extend below the tubular supports 154 and serve to mount thereon the lower gripper arms 152, as by a pair of set screwed bosses 160. The shafts extend considerably above the upper end of the tubular supports 154 and their upper extremities serve to fixedly mount the upper pair of gripping arms 150, as by set screwed bosses 162. Fixed to the shafts 158 at a position adjacent the upper ends of the tubular supports 154 is a pair of set screwed bosses 164 having lever arms 166 extending radially outwardly therefrom. A spacer sleeve 168 is mounted over each of the shafts 158 between the associated bosses 162 and 164. The spacer sleeves 168 are rigidly inter-connected by an upper horizontal gusset plate 170 and a central vertically extending stregthening plate 172 which also is rigidly connected, as by welding and the like, between the upper portions of the tubular supports 154. The mounting structure is further strengthened by means of a forwardly extending convexly shaped bumper plate 174 having its ends suitably welded to the forwardly extending portions of the tubular supports 154.

Any suitable means may be provided for effecting the movement of the gripper arms 150 and 152 between their retracted and operative positions. As shown, each lever arm 166 is apertured to receive a pivot pin 176 which also serves to pivotally receive one end of a pair of vertically spaced links 178. The opposite ends of the links 178 are pivotally connected to a pin 180 which also pivotally receives a connector 182 adapted to be secured as indicated at 184 to a piston end of a hydraulic piston and cylinder unit 186. The cylinder end of each hydraulic piston and cylinder unit 186 is pivotally connected with a pin 188 which, in turn, extends through the associated end of a mounting bracket 190. Mounting bracket 190 includes a forward downwardly extending flange 192 which is fixedly mounted to the flange 112 of the member 114 by the adjacent bolts 98.

Each of the pivot pins 180 also serves to pivotally receive one of the ends of a second pair of spaced links 194. Each pair of links 194 and the pivotally inter-connected pair of links 178 constitute a toggle linkage through which the associated gripper arms 150 and 152 are moved by the associated hydraulic piston and cylinder unit 186 between their retracted and extended positions. The opposite ends of each pair of links 194 are pivoted, as by a pivot pin 196, to mounting blocks 198, fixed as by welding or the like, to the rear surface of the vertical reinforcing plate 172. Thus, each pivot pin 196 provides a fixed pivotal axis for the associated pair of links 194. When the associated hydraulic piston and cylinder unit 186 is retracted, the associated links 178 serve to orient the associated lever arms 166 in a rearwardly extending position as clearly shown in FIG. 6. When the associated hydraulic piston and cylinder unit 186 is extended, pivot pin 180 is moved forwardly in an arcuate path about the associated pivot pin 196 and the associated pair of links 178 serve to move the associated lever arm 166 from a rearwardly extending position arcuately about the axis of the associated shaft 158 into a forwardly extending position as shown in FIG. 8. Hydraulic units 186 are always actuated together so that the gripper arms 150 and 152 will be simultaneously moved with the lever arms 166 between their retracted and extended positions.

FIG. 8 also illustrates the cutter 130 in its extended position, and it will be noted that the convex forwardly extending cutting periphery is disposed longitudinally outwardly from the convexly shaped bumper plate 174 so that it is exposed with respect thereto both longitudinally outwardly and transversely outwardly.

Preferably, the cutter 130 when it is disposed in its retracted position, as shown in FIGS. 3 through 6, is shrouded within a safety housing assembly, generally indicated at 200. The housing assembly includes a bottom wall 202, a partial peripheral wall 204 and a parallel top wall 206 which is centrally apertured and forwardly slotted, as indicated at 208, so as to permit the coupling assembly 128 to move forwardly and rearwardly therein. The safety housing assembly 200 is suitably fixedly mounted on the mounting structure by a pair of brace rods 210 fixed to the rearward portion of the peripheral wall 204 and the outer surface of the rearward ends of the associated gusset plates 134.

FIG. 1 illustrates the condition of the apparatus when in a transport position suitable to be self-propelled under the control of the operator in the cab structure 28 into an operating position in the field where the power line right of way is to be maintained. When the vehicle 12 has been appropriately self-propelled into a position of operation, the hydraulic piston and cylinder units 50 are actuated by the operator to effect movement of the support leg assemblies 38 from the storage positions, shown in FIG. 1, into their extended stabilizing positions, shown in FIG. 2. In this position it will be noted that the foot plate assemblies 46 are disposed in ground engagement in positions transversely outwardly of the ground engagement of the rear wheels 24. This ground engagement of the foot plate assemblies 46 serves to stabilize the rear frame section 18 which carries the boom mounting structure 56. The telescoping boom assembly 14 extends forwardly in a generally horizontally position, as shown in FIG. 1, during transport and the forward frame section 20 includes a forwardly upwardly extending brace structure 212 for engaging the forward end portion of the outer boom section 66 to assist in supporting the same in its storage position. Similarly, a rearward brace structure 214 is provided on the forward end of the frame section 18.

The limb cutting assembly 16 is arranged to provide essentially two cutting modes. In one cutting mode, the cutter is advanced into its fully extended position, as shown in FIG. 8, by actuating hydraulic piston and cylinder unit 144 and the gripper arms 150 and 152 are retained in their rearwardly extending retracted positions, as shown in FIG. 6. Thus, the forward convex cutting periphery of the cutter 130 extends longitudinally outwardly from the fixed mounting structure of the cutting assembly 16 and is exposed both longitudinally outwardly and transversely outwardly so as to enable the same to be moved with a transverse swath cutting action. This cutting mode may be regarded as the cutting mode for all limbs which are positioned with respect to the power lines so that they would not contact or interfere with the power lines during a fall to the ground. To accomplish the swath cutting action, the forwardly extending and exposed cutter 130 is oriented angularly about the longitudinal axis of the boom into a desired position, by actuation of the hydraulic motor 108. Once the cutter has been thus oriented, swath cutting can proceed by the operator actuating the controls associated with the hydraulic motor 64 which effects the horizontal swinging movements of the boom assembly 14 about the vertical axis 59, hydraulic piston and cylinder unit 70 which effects vertical pivotal movement of the boom assembly 14 about the horizontal pivot pin 68 and hydraulic piston and cylinder unit 78 which effects the longitudinal telescoping movements of the telescoping boom. Where good maintenance procedures are carried out the swath cutting mode would be used 90% or more of the time.

Figure 3:
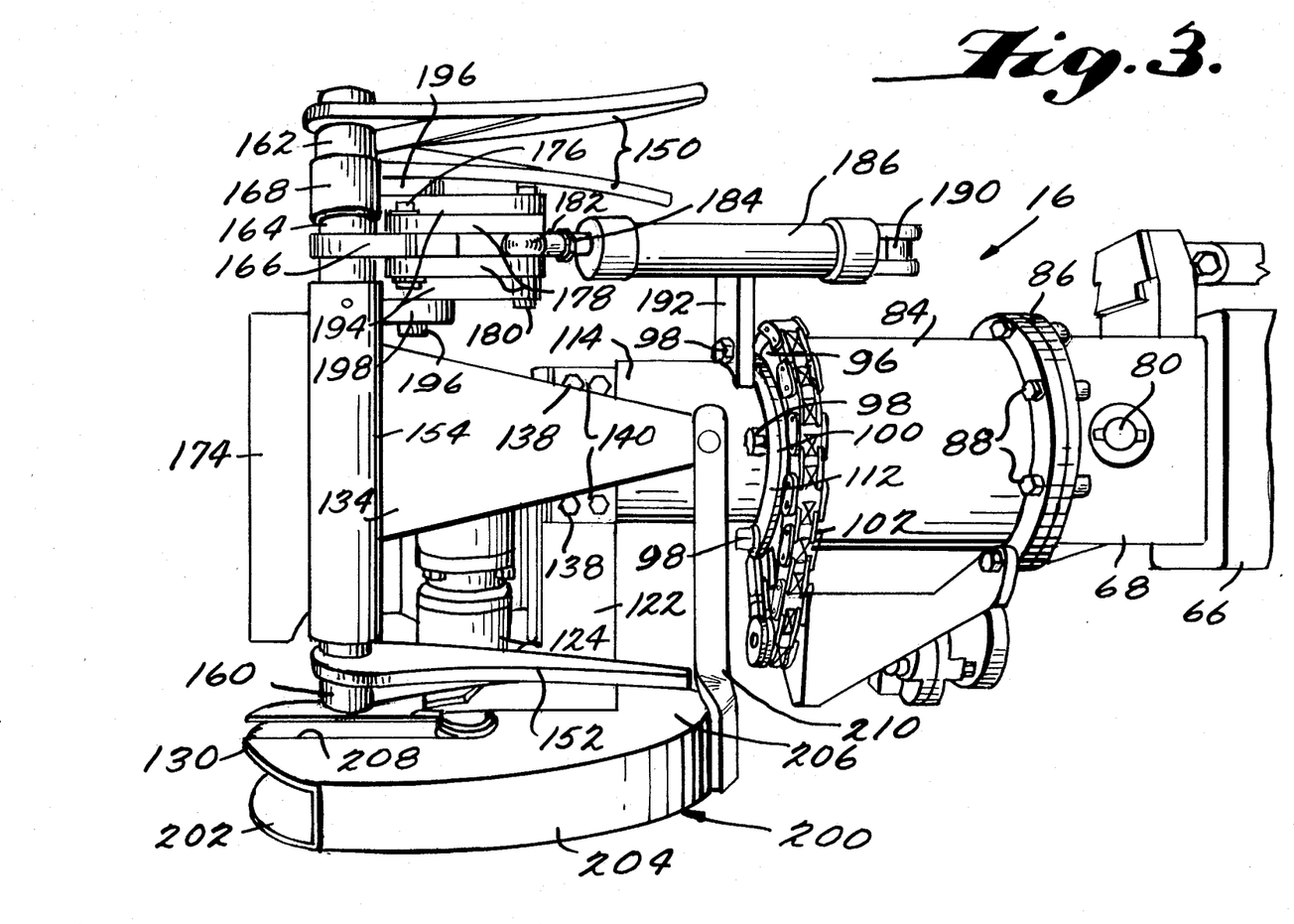
FIG. 3 is a perspective view looking toward the left-hand side of the limb cutting assembly of the apparatus.
Figure 4:
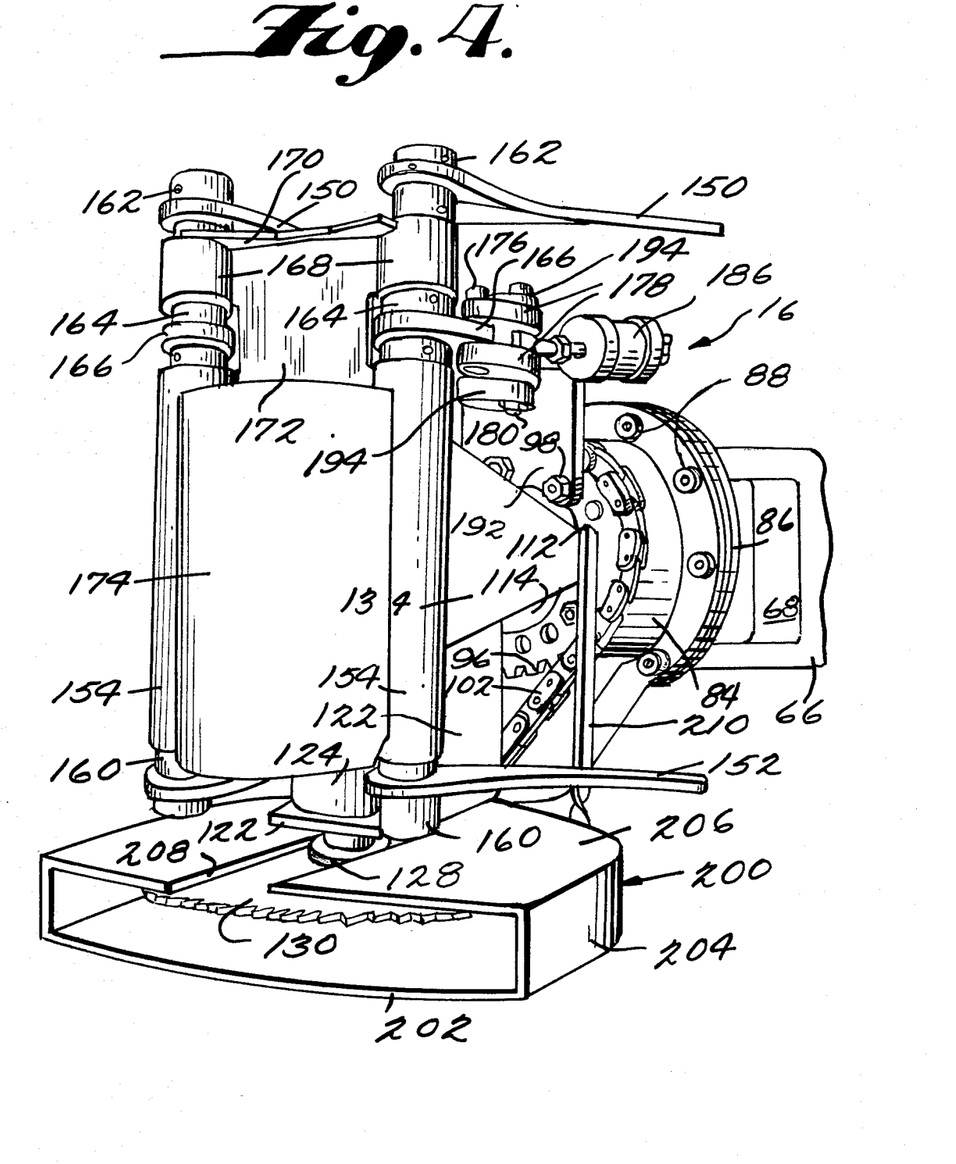
FIG. 4 is a perspective view of the limb cutting assembly of the apparatus looking more toward the front of the same.

The second cutting mode is utilized with respect to limbs which could interfere with the power lines after being cut during their fall to the ground. Where limbs in this condition are encountered, the operator first positions the limb cutting assembly 16 in a position adjacent the limb or group of limbs to be cut by actuating the controls associated with the hydraulic motors or units 64, 70, 78 and 108 respectively. Preferably, the position of the limb cutting assembly 16 is such that the forwardly extending bumper plate 174 is adjacent and parallel with the limb or group of limbs to be cut and both the cutter and grippers are disposed in their retracted positions, as shown in FIGS. 3 and 6. After the limb cutting assembly 16 has been positioned as aforesaid, hydraulic piston and cylinder units 186 are actuated to cause the gripper arms 150 and 152 to swing outwardly and around from their rearwardly extending retracted positions until they are moving arcuately forwardly toward one another so as to finally clamp the limb or group of limbs there between. The final movement brings the limb and group of limbs not only into engagement with the opposed gripper arms but with the forward surface of the bumper plate 174. In this condition, the limb or group of limbs are held or gripped firmly at positions spaced on one side of the cutting plane of the cutter 130. With the limb or group of limbs thus gripped, the operator now actuates the controls associated with the hydraulic piston and cylinder unit 144 so as to extend the same which in turn effects movement of the cutter 130 from its retracted position, as shown in FIG. 6, into its extended position, as shown in FIG. 8. Also as shown in FIG. 8, the forwardly extending exposed concave cutting periphery of the cutter 130 during this movement engages the limb or group of limbs in cutting relation and severs the same. The severed portion of the limb or group of limbs is retained in gripped relation by the gripper arms 150 and 152 permitting the operator to move the gripped limb or group of limbs into a position out of interfering relation with the power lines through actuation of the controls associated with the power motors or units 64, 70, 78 and 108 as aforesaid. When the limb or group of limbs have been moved into a non-interfering position, the operator actuates the controls associated with the hydraulic piston and cylinder units 186 to retract the same so as to move the gripper arms 150 and 152 into their retracted positions, thus releasing the cut limb or group of limbs to fall to the ground in a non-interfering fashion with respect to the power line. This gripping and cutting mode of operation proceeds with respect to limbs and groups of limbs which may potentially interfere with the power lines. Since this mode of operation quite clearly requires more time to complete than the swath cutting mode of operation, it is desirable to utilize the present apparatus relatively frequently for more efficient overall operation in order that the gripping and cutting mode of operation can be used 10% or less of the total operating time.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed:

1. Apparatus for removing limbs of standing trees to maintain a power line right-of-way free of tree limb interference comprising
    a self-propelled vehicle having power operated ground stabilizing means,
    a telescoping boom,
    means mounting one end of the boom on said vehicle for horizontal swinging movement about an upright axis and for vertical pivoting movement,
    a limb cutting assembly on the opposite free end of said boom, said assembly including
    a mounting structure,
    means mounting said mounting structure on said boom for movements about a longitudinal axis with respect to said boom,
    a power operated cutter having a convex cutting periphery,
    means mounting said cutter on said mounting structure for movement between a retracted inoperable position and an extended operative position wherein said convex cutting periphery extends longitudinally outwardly from said mounting structure and is exposed both longitudinally outwardly and transversely outwardly so as to enable the same to be moved with a transverse swath cutting action by virtue of the movements of the boom, and
    limb gripping means carried by said mounting structure for movement from an inoperative position disposed longitudinally inwardly of said cutter so as to permit the swath cutting action thereof and an operative position disposed longitudinally outwardly of said cutter when the latter is in its retracted position so as to grippingly engage a limb or a group of limbs and hold the same in a position to be cut in response to the movement of the cutter from its retracted position into its extended position.

2. Apparatus as defined in claim 1 wherein said self-propelled vehicle comprises separate front and rear frame sections, means connecting said front and rear frame sections together for pivotal movement about a vertical axis disposed between said front and rear frame sections, separate front and rear wheel assemblies supporting said front and rear frame sections respectively and power operated means for effecting pivotal steering movements between said front and rear frame sections.

3. Apparatus as defined in claim 2 wherein said boom mounting means is on said rear frame section.

4. Apparatus as defined in claim 3 wherein said upright axis is disposed rearwardly of the axis of said rear wheel assembly.

5. Apparatus as defined in claim 4 wherein said power operated ground stabilizing means comprises four support leg assemblies mounted on said rear frame section in longitudinally and transversely spaced relation with respect to one another for movements between an upright storage and transport position and a transversely outwardly extending ground engaging and stabilizing position and power operated means for effecting said movements of said support leg assemblies.

6. Apparatus as defined in claim 5 wherein each of said support leg assemblies include a leg member pivoted at one end to said rear frame section and having a foot plate pivoted to the other end thereof.

7. Apparatus as defined in claim 6 wherein the power operated means for each support leg assembly comprises a hydraulic piston and cylinder unit connected between said rear frame section and said leg member.

8. Apparatus as defined in claim 1 wherein said telescoping boom includes an outer boom section providing the one end of said boom which is mounted on said vehicle and an inner boom section providing the opposite free end of said boom on which is mounted said mounting structure.

9. Apparatus as defined in claim 8 wherein said mounting structure includes an outer tubular member rotatably supported on the free end of said inner boom section.

10. Apparatus as defined in claim 9 wherein said outer tubular member includes a sprocket ring fixed to the exterior periphery thereof, a power operated drive sprocket mounted on the outer end of said inner boom section and a chain trained about said sprocket ring and said sprocket.

11. Apparatus as defined in claim 9 wherein said cutter mounting means includes an inner tubular member mounted within said outer tubular member for longitudinal reciprocating movements with respect thereto outwardly thereof.

12. Apparatus as defined in claim 11 wherein said inner and outer tubular members have a hydraulic piston and cylinder unit therein for effecting the longitudinal reciprocating movements of said inner tubular member with respect to said outer tubular member.

13. Apparatus as defined in claim 11 wherein guide means is provided between said inner and outer tubular members for restricting the reciprocating movements of said inner member with respect to said outer member to rectilinear movements.

14. Apparatus as defined in claim 13 wherein said cutter comprises a circular saw blade, a power operated shaft and coupling means connecting said circular saw blade on said power operated shaft, said cutter mounting means further including a bracket structure fixedly supporting said power operated shaft on the forward end of said inner tubular member with the axis of rotation of said shaft extending perpendicularly from the rotational axis of said inner tubular member and the cutting plane of said saw blade disposed in spaced parallel relation thereto.

15. Apparatus as defined in claim 13 wherein said guide means includes a pair of guide rails forming a part of said mounting structure fixed to and extending longitudinally forwardly of said outer tubular member, said inner member including means slidably engaging said guide rails.

16. Apparatus as defined in claim 13 wherein said limb gripping means comprises two spaced cooperating pairs of gripper arms, one pair of gripper arms being spaced between said saw blade and the axis of rotation of said inner member and the other pair being spaced from the axis of rotation of said inner tubular member in the opposite direction.

17. Apparatus as defined in claim 16 wherein said mounting structure includes a pair of tubular supports fixed in parallel relation with respect to said axis of rotation of said power operated shaft, a pair of shafts journaled in said tubular supports and extending outwardly from opposite ends thereof, said pairs of gripper arms being fixed to the outwardly extending ends respectively of said pair of shafts, and power operated means for effecting rotational movements of said shafts in opposite directions to move said gripper arms between said inoperative and operative positions.

18. Apparatus as defined in claim 17 wherein said power operated means for moving said shafts includes a toggle linkage operatively connected between said mounting structure and each of said shafts and a hydraulic piston and cylinder unit connected between said mounting structure and each of said toggle linkages.

19. Apparatus as defined in claim 17 wherein said mounting structure includes a forwardly convex bumper plate fixed between said tubular supports.

20. Apparatus as defined in claim 19 wherein said saw blade is shrouded in a safety housing fixedly supported on said mounting structure.

21. A limb cutting assembly comprising a power operated cutter having a convex cutting periphery, means mounting said cutter on said mounting structure for movement between a retracted inoperable position and an extended operative position wherein said convex cutting periphery extends longitudinally outwardly from said mounting structure and is exposed both longitudinally outwardly and transversely outwardly so as to enable the same to be moved with a transverse swath during action, and limb gripping means carried by said mounting structure for movement from an inoperative position disposed longitudinally inwardly of said cutter so as to permit the swath cutting action thereof and operative position disposed longitudinally outwardly of said cutter when the latter is in its retracted position so as to grippingly engage a limb or a group of limbs and hold the same in a position to be cut in response to the movement of the cutter from its retracted position into its extended position.

22. A limb cutting assembly as defined in claim 21 wherein said mounting structure includes an outer tubular and said cutter mounting means includes an inner tubular member mounted within said outer tubular member for longitudinal reciprocating movements with respect thereto outwardly thereof.

23. A limb cutting assembly as defined in claim 22 wherein said inner and outer tubular members have a hydraulic piston and cylinder unit therein for effecting the longitudinal reciprocating movements of said inner tubular member with respect to said outer tubular member.

24. A limb cutting assembly as defined in claim 22 wherein guide means is provided between said inner and outer tubular members for restricting the reciprocating movements of said inner member with respect to said outer member to rectilinear movements.

25. A limb cutting assembly as defined in claim 24, wherein said cutter comprises a circular saw blade, a power operated shift and coupling means connecting said circular saw blade on said power operated shaft, said cutter mounting means further including a bracket structure fixedly supporting said power operated shaft on the forward end of said inner tubular member with the axis of rotation of said shaft extending perpendicularly from the rotational axis of said inner tubular member and the cutting; plane of said saw blade disposed in spaced parallel relation thereto.

26. A limb cutting assembly as defined in claim 24 wherein said guide means includes a pair of guide rails forming a part of said mounting structure fixed to and extending longitudinally forwardly of said outer tubular member, said inner member including means slidably engaging said guide rails.

27. A limb cutting assembly as defined in claim 24 wherein said limb gripping means comprises two spaced cooperating pairs of gripper arms, one pair of gripper arms being spaced between said saw blade and the axis of rotation of said member, and the other pair being spaced from the axis of rotation of said inner tubular member in the opposite direction.

28. A limb cutting assembly as defined in claim 27 wherein said mounting structure includes a pair of tubular supports fixed in parallel relation with respect to said axis of rotation of said power operated shaft, a pair of shafts journaled in said tubular supports and extending outwardly from opposite ends thereof, said pairs of gripper arms being fixed to the outwardly extending ends respectively of said pair of shafts, and power operated means for effecting rotational movements of said shafts in opposite directions to move said gripper arms between said inoperative and operative positions.

29. A limb cutting assembly as defined in claim 28 wherein said power operated means for moving said shafts includes a toggle linkage operatively connected between said mounting structure and each of said shafts and a hydraulic piston and cylinder unit connected between said mounting structure and each of said toggle linkages.

30. A limb cutting assembly as defined in claim 28 wherein said mounting structure includes a forwardly convex bumper plate fixed between said tubular supports.

31. A limb cutting assembly as defined in claim 30 wherein said saw blade is shrouded in a safety housing fixedly supported on said mounting structure.

* * * * *